United States Patent
Huang et al.

(10) Patent No.: US 11,858,578 B2
(45) Date of Patent: Jan. 2, 2024

(54) FOOT-DECK DEVICE AND VEHICLE

(71) Applicant: Ninebot (Changzhou) Tech Co., Ltd., Changzhou (CN)

(72) Inventors: Xuanyu Huang, Changzhou (CN); Can Wang, Changzhou (CN); Ke Chen, Changzhou (CN); Chao Ren, Changzhou (CN)

(73) Assignee: Ninebot (Changzhou) Tech Co., Ltd., Changzhou (CN)

( * ) Notice: Subject to any disclaimer, the term of this patent is extended or adjusted under 35 U.S.C. 154(b) by 305 days.

(21) Appl. No.: 17/329,521

(22) Filed: May 25, 2021

(65) Prior Publication Data
US 2021/0371033 A1  Dec. 2, 2021

(30) Foreign Application Priority Data
May 26, 2020  (CN) .......................... 202010456908.9

(51) Int. Cl.
*B62J 25/04* (2020.01)
*B62J 25/00* (2020.01)
*B62J 45/00* (2020.01)

(52) U.S. Cl.
CPC .............. *B62J 25/00* (2013.01); *B62J 25/04* (2020.02); *B62J 45/00* (2020.02)

(58) Field of Classification Search
CPC ...................................................... B62J 25/04
See application file for complete search history.

(56) References Cited

U.S. PATENT DOCUMENTS

| | | | |
|---|---|---|---|
| 7,757,583 B1 * | 7/2010 | Reading ................... | G05G 1/60 74/564 |
| 9,701,355 B2 * | 7/2017 | Chang ...................... | B62J 25/04 |
| 9,731,783 B2 * | 8/2017 | Artemev ................. | B60L 50/60 |
| 10,207,763 B2 * | 2/2019 | Artemev ................. | B60L 3/106 |
| 2022/0153376 A1 * | 5/2022 | Hallen ..................... | B62J 25/04 |

FOREIGN PATENT DOCUMENTS

| | | |
|---|---|---|
| CN | 201784420 U | 4/2011 |
| CN | 202498980 U | 10/2012 |
| CN | 105252979 A | 1/2016 |
| JP | H09-242653 | 9/1997 |

OTHER PUBLICATIONS

European Extended Search Report dated Sep. 15, 2021 for Application No. 21175241.5, 7 pages.

\* cited by examiner

*Primary Examiner* — Tony H Winner
*Assistant Examiner* — Hosam Shabara
(74) *Attorney, Agent, or Firm* — Frost Brown Todd LLP

(57) ABSTRACT

The present disclosure provides a foot-deck device and a vehicle. The foot-deck device includes: a bracket; two deck assemblies oppositely disposed on the bracket, the two deck assemblies each including a deck and a rotating shaft, the rotating shafts being pivotally disposed on the bracket, and the decks being disposed on the rotating shafts; and a linkage mechanism, the rotating shaft of one deck assembly being coupled to the rotating shaft of the other deck assembly through the linkage mechanism, the linkage mechanism being used to cause the rotating shafts of the two deck assemblies to rotate synchronously and cause the decks of the two deck assemblies to rotate synchronously to respective folded positions or unfolded positions.

20 Claims, 7 Drawing Sheets

FOOT-DECK DEVICE AND VEHICLE

CROSS-REFERENCE TO RELATED APPLICATION

This application claims priority to and benefits of Chinese Patent Application Serial No. 202010456908.9, filed with National Intellectual Property Administration of PRC on May 26, 2020, the entire content of which is incorporated herein by reference.

FIELD

The present disclosure relates to a field of foot-deck devices, and more particularly to a foot-deck device and a vehicle.

BACKGROUND

Two decks of a vehicle are disposed on two sides of a frame for the user to step on during driving. In order to reduce space occupied by the vehicle when it is not in use and facilitate the storage and transportation of the vehicle, the two decks have a folded position and an unfolded position. When the vehicle is in use, the two decks are in the unfolded position; when the vehicle is not in use, the two decks are in the folded position.

However, in the related art, the two decks are adjusted separately. Each time the vehicle is used or stored, two open operations and two close operations are required. The operations are complicated, time-consuming, and laborious.

SUMMARY

According to an aspect of the present disclosure, a foot-deck device is provided, which includes: a bracket; two deck assemblies oppositely disposed on the bracket, the two deck assemblies each including a deck and a rotating shaft, the rotating shafts being pivotally disposed on the bracket, and the decks being disposed on the rotating shafts; and a linkage mechanism, the rotating shaft of one deck assembly being coupled to the rotating shaft of the other deck assembly through the linkage mechanism, the linkage mechanism being configured to cause the rotating shafts of the two deck assemblies to rotate synchronously and cause the decks of the two deck assemblies to rotate synchronously to respective folded positions or unfolded positions.

According to another aspect of the present disclosure, a vehicle is provided. The vehicle includes a frame and a foot-deck device. The foot-deck device includes: a bracket; two deck assemblies oppositely disposed on the bracket, the two deck assemblies each including a deck and a rotating shaft, the rotating shafts being pivotally disposed on the bracket, and the decks being disposed on the rotating shafts; and a linkage mechanism, the rotating shaft of one deck assembly being coupled to the rotating shaft of the other deck assembly through the linkage mechanism, the linkage mechanism being configured to cause the rotating shafts of the two deck assemblies to rotate synchronously and cause the decks of the two deck assemblies to rotate synchronously to respective folded positions or unfolded positions. The foot-deck device is secured to the frame.

BRIEF DESCRIPTION OF THE DRAWINGS

The accompanying drawings constituting a part of the specification of the present disclosure are used to provide a further understanding of the present disclosure. Schematic embodiments of the present disclosure and the description thereof are used to explain the present disclosure, and are not intended to inappropriately limit the present disclosure. In the drawings.

DETAILED DESCRIPTION

Figure 1:
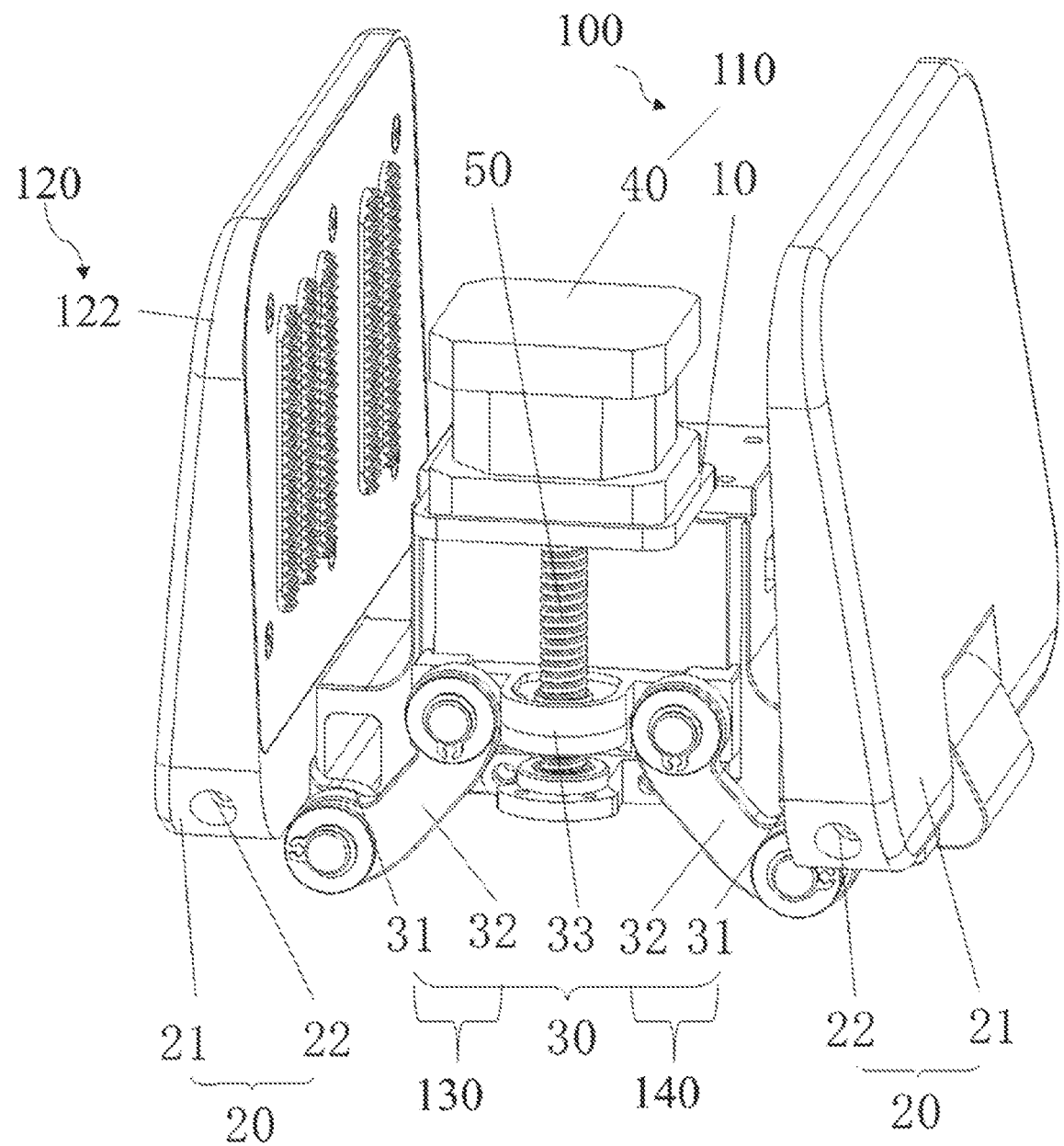
FIG. 1 is a schematic perspective view of a foot-deck device according to a first embodiment of the present disclosure, in which the foot-deck device is in a folded state.

The technical solutions in the embodiments of the present disclosure will be clearly and completely described below with reference to the drawings in the embodiments of the present disclosure. Apparently, the embodiments described are merely a part of rather than all of the embodiments of the present disclosure. The following description of at least one exemplary embodiment is in fact merely illustrative and is in no way intended as a limitation to the present disclosure and its application or use therewith. All other embodiments obtained by those of ordinary skill in the art based on the embodiments of the present disclosure without creative efforts fall within the protection scope of the present disclosure.

In order to solve the problem in the related art that open and close operations of the foot-deck device are complicated, the present disclosure provides a foot-deck device 100 and a vehicle 1000.

As illustrated in FIGS. 1 to 8, the foot-deck device 100 includes a bracket 10, two deck assemblies 20, and a linkage mechanism 30. The two deck assemblies 20 are oppositely disposed on the bracket 10. The two deck assemblies 20 each include a deck 21 and a rotating shaft 22. The rotating shafts 22 are pivotally disposed on the bracket 10, and the decks 21 are disposed on the respective rotating shafts 22. The rotating shaft 22 of one deck assembly 20 is coupled to the rotating shaft 22 of the other deck assembly 20 through the linkage mechanism 30. The linkage mechanism 30 is used to cause the rotating shafts 22 of the two deck assemblies 20 to rotate synchronously and cause the decks 21 of the two deck assemblies 20 to rotate synchronously to respective folded positions or unfolded positions.

In the present disclosure, the structure of the foot-deck device 100 is optimized, so that the two rotating shafts 22 of the two deck assemblies 20 are coupled through the linkage mechanism 30, and the two decks 21 rotate synchronously to folded positions or unfolded positions. Each time the vehicle 1000 is used or stored, only one open operation or close operation is required, and there are advantages of simple, time-saving, and labor-saving operations.

In some embodiments, under the transmission of the linkage mechanism 30, the rotating shaft 22 of one deck assembly 20 and the rotating shaft 22 of the other deck assembly 20 have opposite rotation directions, so that the decks 21 of the two deck assemblies 20 rotate towards each other to the folded positions or rotate away from each other to the unfolded positions.

In some embodiments, the foot-deck device 100 further includes an electric drive mechanism 110. An output end of the electric drive mechanism 110 is coupled to any one of the rotating shafts 22 of the two deck assemblies 20, so that the two decks 21 are driven to rotate synchronously through the electric drive mechanism 110. In this way, the electric drive mechanism 110 is used to control any one of the rotating shafts 22 of the two deck assemblies 20 to rotate, and the rotating shaft 22 may drive the other rotating shaft 22 to rotate under the transmission of the linkage mechanism 30, so that the two rotating shafts 22 drive the two decks 21 to rotate synchronously to the folded positions or unfolded positions, which improves the degree of automation of the foot-deck device 100, reduces the labor intensity of a user, makes the operation simpler, and only needs to control the electric drive mechanism 110 to start.

In some embodiments, the foot-deck device 100 further includes an electric drive mechanism 110. An output end of the electric drive mechanism 110 is coupled to the linkage mechanism 30, so that the decks 21 of the two deck assemblies 20 are driven to rotate synchronously through the electric drive mechanism 110. In this way, the electric drive mechanism 110 is used to drive the rotating shafts 22 of the two deck assemblies 20 to rotate synchronously through the linkage mechanism 30, so that the two decks 21 of the two deck assemblies 20 rotate synchronously to the folded positions or unfolded positions, which improves the degree of automation of the foot-deck device 100, reduces the labor intensity of the user, makes the operation simpler, and only needs to control the electric drive mechanism 110 to start.

In some embodiments, the foot-deck device 100 further includes a manual trigger mechanism 120. The manual trigger mechanism 120 is coupled to any one of the rotating shafts 22 of the two deck assemblies 20, and the manual trigger mechanism 120 has a manual trigger end 122, so that the two decks 21 are driven to rotate synchronously through the manual trigger end 122 under an external force. In this way, the user may drive any one of the rotating shafts 22 of the two deck assemblies 20 to rotate through the manual trigger mechanism 120, and the rotating shaft 22 may drive the other rotating shaft 22 to rotate under the transmission of the linkage mechanism 30, so that the two rotating shafts 22 drive the two decks 21 to rotate synchronously to the folded positions or unfolded positions, which makes the operation simpler and only requires the user to apply an external force to a manual trigger end 122.

In some embodiments, the manual trigger mechanism 120 is a key or a paddle or a push rod.

In some embodiments, the foot-deck device 100 further includes a manual trigger mechanism 120. The manual trigger mechanism 120 is coupled to the linkage mechanism 30, and the manual trigger mechanism 120 has a manual trigger end 122, so that the decks 21 of the two deck assemblies 20 are driven to rotate synchronously through the manual trigger end 122 under an external force. In this way, the user may apply an external force to the manual trigger end 122 of the manual trigger mechanism 120, so that the manual trigger mechanism 120 drives the rotating shafts 22 of the two deck assemblies 20 to rotate synchronously through the linkage mechanism 30, and the two decks 21 of the two deck assemblies 20 rotate synchronously to the folded positions or unfolded positions, which makes the operation simpler and only requires the user to apply an external force to a manual trigger end 122.

In some embodiments, one of the decks 21 of the two deck assemblies 20 serves as the manual trigger end 122, so that the decks 21 of the two deck assemblies 20 are driven to rotate synchronously through the manual trigger end 122 under an external force. In this way, the structure of the foot-deck device 100 is further simplified. One of the decks 21 of the two deck assemblies 20 serves as the manual trigger end 122, the user applies an external force to the deck 21 to make it rotate relative to the bracket 10, the deck 21 drives its corresponding rotating shaft 22 to rotate, the rotating shaft 22 drives the rotating shaft 22 of the other deck assembly 20 to rotate under the transmission of the linkage mechanism 30, and the rotating shaft 22 of the other deck assembly 20 drives its corresponding deck 21 to rotate, so that the two decks 21 of the two deck assemblies 20 both rotate to the folded positions or unfolded positions, which makes the operation simpler and only requires the user to apply an external force to a manual trigger end 122.

In order to achieve a linkage effect, the linkage mechanism 30 includes a driving component 170 and a driven component 180. One driving component 170 and one driven component 180 are provided, the driven component 180 is coupled to both of the two deck assemblies 20, and the driving component 170 is drivingly coupled to the driven component 180; or one driving component 170 and two driven components 180 are provided, one driven component 180 is coupled to one deck assembly 20, the other driven component 180 is coupled to the other deck assembly 20, and the driving component 170 is drivingly coupled to the two driven components 180; or two driving components 170 and two driven components 180 are provided, the two driving components 170 and the two driven components 180 are drivingly coupled in a one-to-one correspondence, one driven component 180 is coupled to one deck assembly 20, the other driven component 180 is coupled to the other deck assembly 20, and the two driving components 170 are drivingly coupled to move synchronously.

In order to achieve synchronous movement of the two deck assemblies 20, in one implementation, the linkage mechanism 30 includes: a lifting assembly 190 having a lifting portion 192 movable in a predetermined direction; and two coupling rods 32. The two coupling rods 32 are both coupled to the lifting portion 192, one coupling rod 32 is drivingly coupled to one deck assembly 20, and the other coupling rod 32 is drivingly coupled to the other deck assembly 20.

In order to achieve synchronous movement of the two deck assemblies 20, in another implementation, the linkage mechanism 30 includes: two driving wheels 200 drivingly coupled to move synchronously; and two driven wheel sets 210. One driving wheel 200 and the rotating shaft 22 of one deck assembly 20 are fitted with a first synchronous belt 220, and the other driving wheel 200 and the rotating shaft 22 of the other deck assembly 20 are fitted with a second synchronous belt 230. The two driven wheel sets 210 are pressed on the first synchronous belt 220 and the second synchronous belt 230 in a one-to-one correspondence.

The present disclosure provides a number of specific embodiments according to different linkage mechanisms 30, which are described in detail below.

Embodiment 1

As illustrated in FIGS. 1 to 4, the linkage mechanism 30 includes a first linkage assembly 130 used to be coupled to one deck assembly 20, a second linkage assembly 140 used to be coupled to the other deck assembly 20, and a coupling member 33. The first linkage assembly 130 and the second linkage assembly 140 each include a crank 31 and a coupling rod 32. First ends of the cranks 31 are coupled to the respective decks 21, and first ends of the coupling rods 32 are hinged to second ends of the respective cranks 31. The coupling member 33 is hinged to both a second end of the coupling rod 32 of the first linkage assembly 130 and a second end of the coupling rod 32 of the second linkage assembly 140, and the coupling member 33 is movably disposed in a vertical direction, so that the rotating shafts 22 of the two deck assemblies 20 are driven to rotate synchronously through the coupling member 33. In this way, when the coupling member 33 moves in the vertical direction under an external force, the coupling member 33 drives the two rotating shafts 22 to rotate synchronously through the two coupling rods 32 and the two cranks 31, and the two rotating shafts 22 drive the two decks 21 to rotate synchronously to the folded positions or unfolded positions.

As illustrated in FIGS. 1 to 4, the foot-deck device 100 includes a rotary motor 40 and a lead screw 50, the coupling member 33 includes a nut 150 fitting with the lead screw, the rotary motor 40 is disposed on the bracket 10, the lead screw 50 is coupled to an output shaft of the rotary motor 40, and the nut 150 is fitted over the lead screw 50. The coupling member 33 is hinged to the second end of the coupling rod 32 of the first linkage assembly 130 and the second end of the coupling rod 32 of the second linkage assembly 140 through the nut 150, or the nut 150 is provided with a coupling slider 160, and the coupling member 33 is hinged to the second end of the coupling rod 32 of the first linkage assembly 130 and the second end of the coupling rod 32 of the second linkage assembly 140 through the coupling slider 160. In this way, the rotary motor 40 is controlled to start, the output shaft of the rotary motor 40 drives the lead screw 50 to rotate, the lead screw 50 drives the nut 150 to move in the vertical direction, the nut 150 drives the two rotating shafts 22 to rotate synchronously through the two coupling rods 32 and the two cranks 31, and the two rotating shafts 22 drive the two decks 21 to rotate synchronously to the folded positions or unfolded positions, which improves the degree of automation of the foot-deck device 100, reduces the labor intensity of the user, makes the operation simpler, and only needs to control the rotary motor 40 to start.

Figure 2:
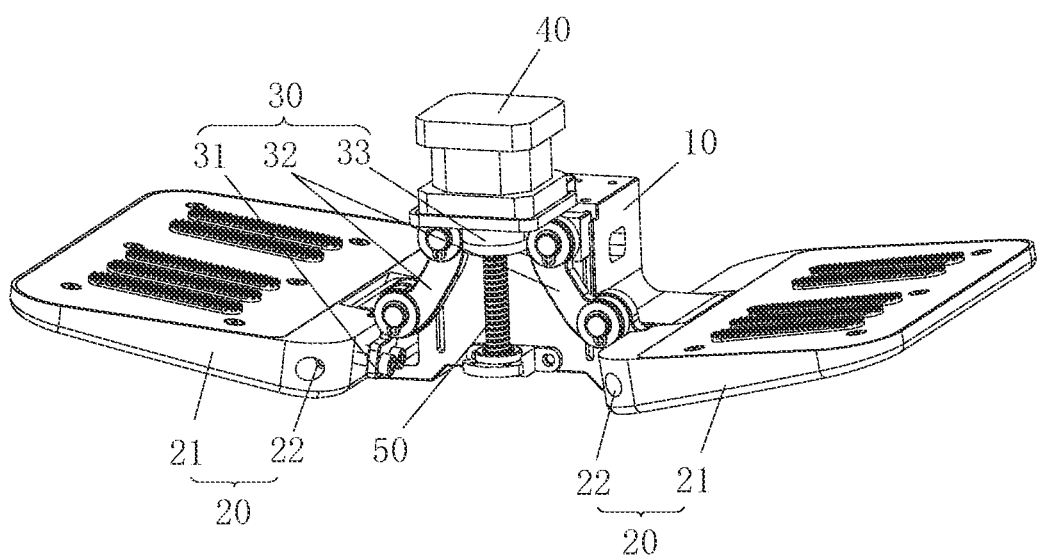
FIG. 2 is a schematic perspective view of a foot-deck device according to a first embodiment of the present disclosure, in which the foot-deck device is in an unfolded state.
Figure 3:
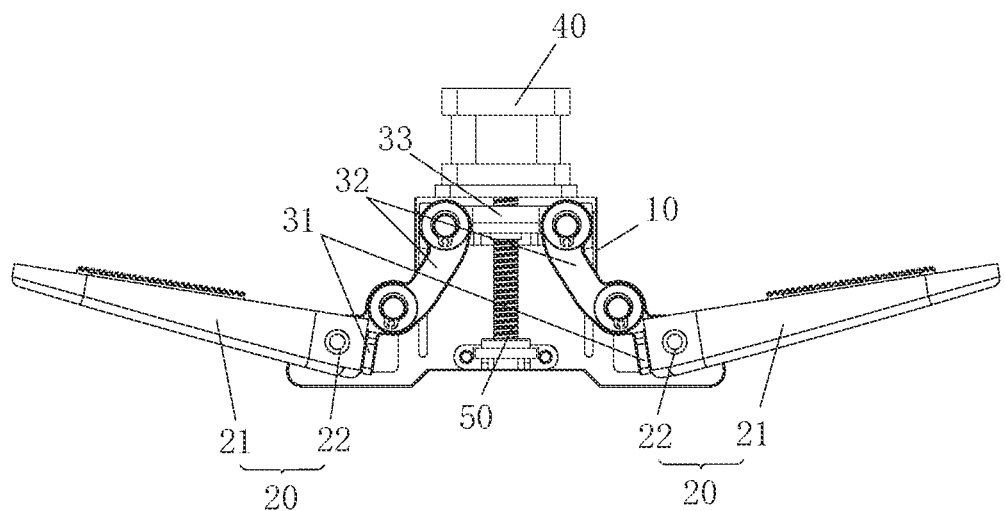
FIG. 3 is a schematic front view of the foot-deck device in FIG. 2.

As illustrated in FIG. 1, when the nut 150 moves downwards, left and right decks are closed until the two decks 21 move to the folded positions. As illustrated in FIG. 2, when the nut 150 moves upwards, the left and right decks are unfolded until the two decks 21 move to the unfolded positions. The upward and downward movement of the nut 150 is controlled by forward and reverse rotation of the rotary motor 40.

In some embodiments, the bracket 10 may be a single part or an assembly formed by fixed couplings and combinations of a plurality of parts.

Figure 4:
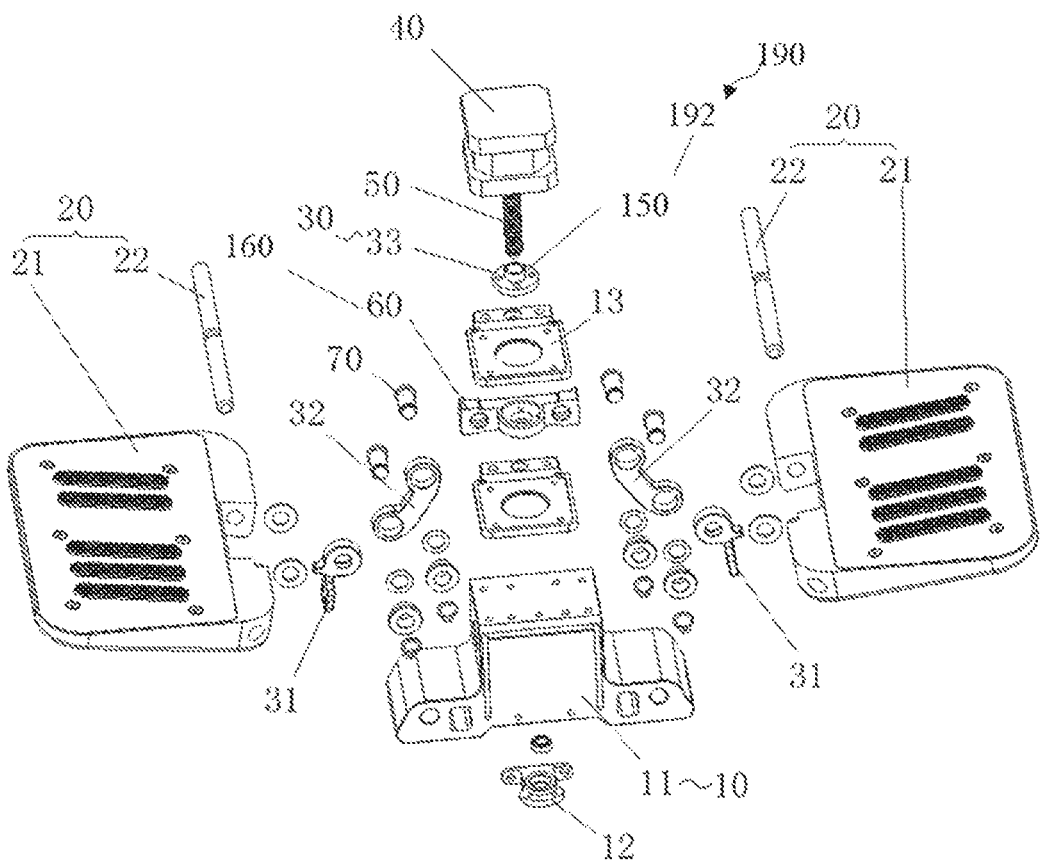
FIG. 4 is a schematic exploded view of the foot-deck device in FIG. 2.
Figure 5:
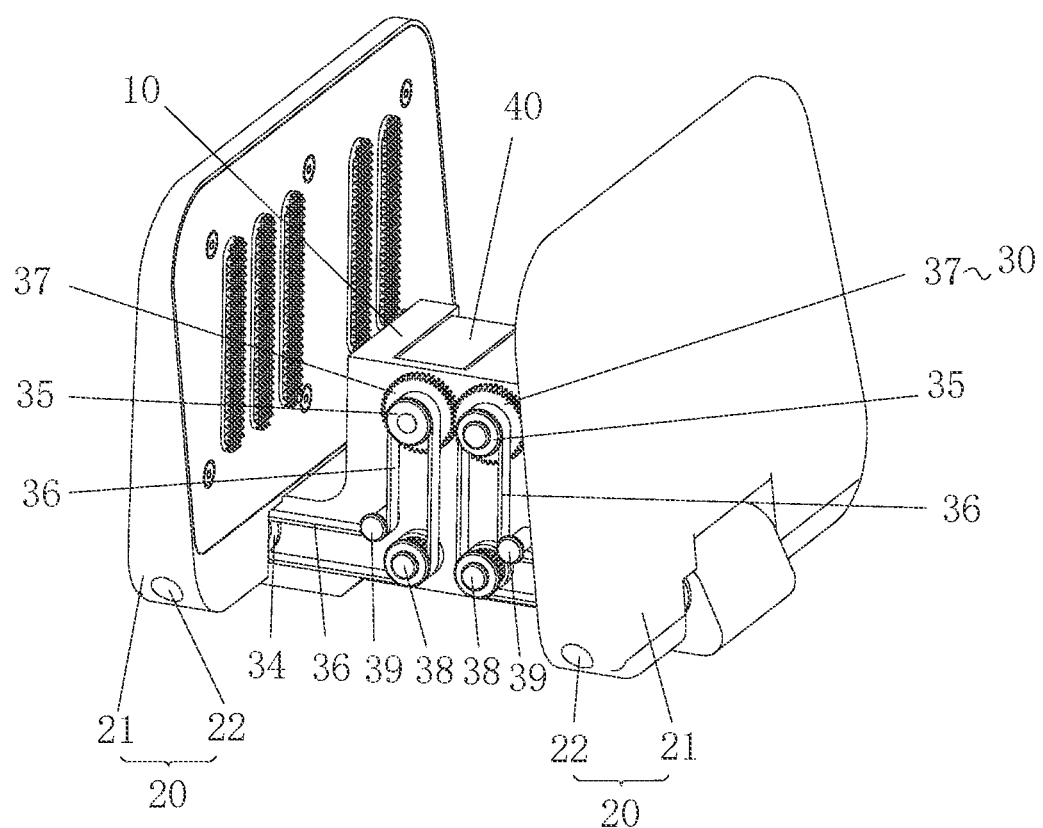
FIG. 5 is a schematic perspective view of a foot-deck device according to a second embodiment of the present disclosure, in which the foot-deck device is in a folded state.
Figure 6:
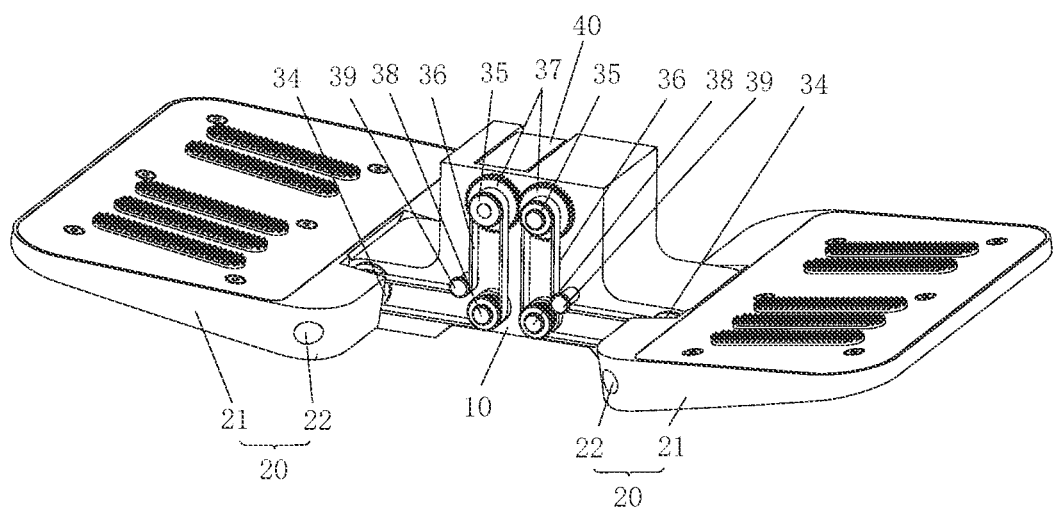
FIG. 6 is a schematic perspective view of a foot-deck device according to a second embodiment of the present disclosure, in which the foot-deck device is in an unfolded state.
Figure 7:
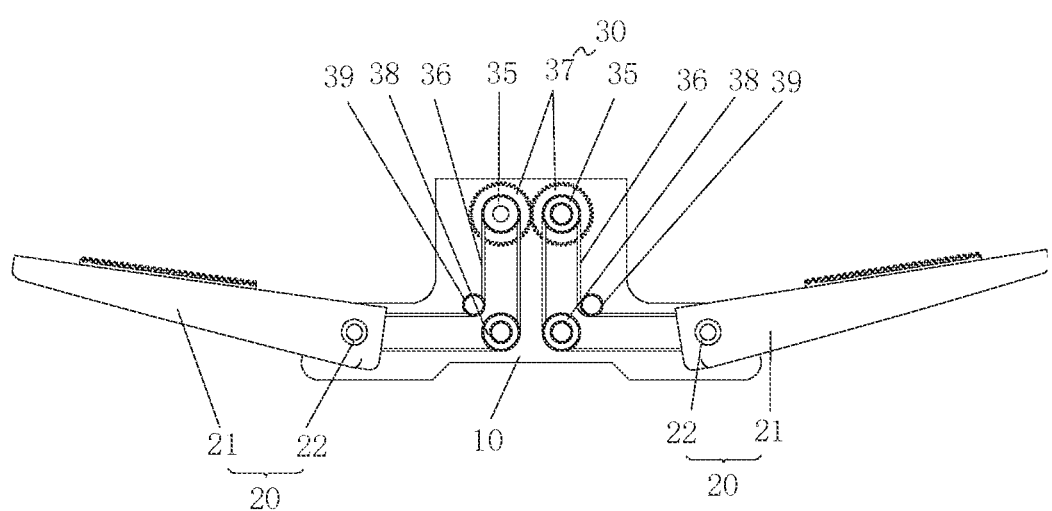
FIG. 7 is a schematic front view of the foot-deck device in FIG. 6.
Figure 8:
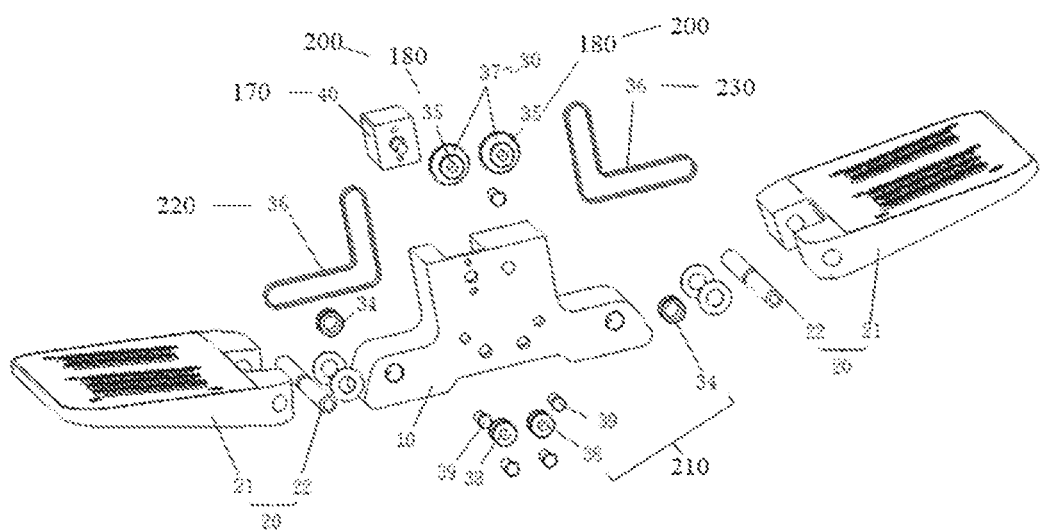
FIG. 8 is a schematic exploded view of the foot-deck device in FIG. 6.

In an optional embodiment illustrated in FIG. 4, the bracket 10 is an assembly. The bracket 10 includes a column 11, a support base 12, and a fixed plate 13. The support base 12 is mounted on the column 11, for fixing the lead screw 50. The fixed plate 13 is mounted on the column 11, for fixing the rotary motor 40.

In the optional embodiment illustrated in FIG. 4, the foot-deck device 100 includes a mounting member 60 and a hinge pin 70. The mounting member 60 is coupled to the nut 150. The coupling rod 32 is coupled to the mounting member 60. Second ends of the two coupling rods 32 are coupled to the nut 150 through the mounting member 60.

Embodiment 2

As illustrated in FIGS. 5 to 8, the linkage mechanism 30 includes a first linkage assembly 130 used to be coupled to one deck assembly 20 and a second linkage assembly 140 used to be coupled to the other deck assembly 20. The first linkage assembly 130 and the second linkage assembly 140 each include a first pulley 34, a second pulley 35, a synchronous belt 36, and a first gear 37. The first pulleys 34 are disposed on the respective rotating shafts 22, the second pulleys 35 are spaced apart from the respective first pulleys 34, the synchronous belts 36 are fitted over the respective first and second pulleys 34, 35, and the first gears 37 are coupled to the respective second pulleys 35. The first gear 37 of the first linkage assembly 130 engages with the first gear 37 of the second linkage assembly 140. In this way, when the first gear 37 of the first linkage assembly 130 rotates under an external force, the first gear 37 drives the first gear 37 of the second linkage assembly 140 to rotate, the first gears 37 drive the respective second pulleys 35 to rotate, the second pulleys 35 drive the first pulleys 34 to rotate under the transmission of the respective synchronous belts 36, the first pulleys 34 drive the respective rotating shafts 22 to rotate, and the rotating shafts 22 drive the respective decks 21 to rotate, so that the two decks 21 rotate synchronously to the folded positions or unfolded positions.

In some embodiments, when the deck 21 or the rotating shaft 22 of one deck assembly 20 rotates under an external force, the rotating shaft 22 of the other deck assembly 20 may also be driven to rotate under the transmission of the linkage mechanism 30, so that the two decks 21 rotate synchronously to the folded positions or unfolded positions.

As illustrated in FIGS. 5 to 8, the foot-deck device 100 includes a rotary motor 40. An output end of the rotary motor 40 is coupled to the first gear 37 of the first linkage assembly 130 or the first gear 37 of the second linkage assembly 140. In this way, the rotary motor 40 is controlled to start, and the rotary motor 40 drives the first gear 37 of the first linkage assembly 130 or the first gear 37 of the second linkage assembly 140 to rotate, so that the decks 21 of the two deck assemblies 20 rotate synchronously to the folded positions or unfolded positions, which improves the degree of automation of the foot-deck device 100, reduces the labor intensity of the user, makes the operation simpler, and only needs to control the rotary motor 40 to start.

As illustrated in FIGS. 5 to 8, the first linkage assembly 130 and the second linkage assembly 140 each include a reversing pulley 38 and a tension pulley 39. The reversing pulleys 38 are disposed between the respective first and second pulleys 34, 35, the first pulleys 34 and the reversing pulleys 38 are spaced apart in a first direction, the second pulleys 35 and the reversing pulleys 38 are spaced apart in a second direction, the synchronous belts 36 are fitted over the first pulleys 34, the reversing pulleys 38, and the second pulleys 35, and the tension pulleys 39 are spaced apart from the reversing pulleys 38 and are located on outer sides of the synchronous belts 36, so that the synchronous belts 36 each include a first transmission portion extending in the first direction and a second transmission portion extending in the second direction. In this way, positions of the first gears 37 can be flexibly set by providing the tension pulleys 39 and the reversing pulleys 38. At the same time, the mounting of the rotary motor 40 can be facilitated.

Embodiment 3

The present disclosure further provides unillustrated Embodiment 3. Embodiment 3 is different from Embodiment 1 in that the foot-deck device 100 includes a linear motor and a guide rail, the coupling member 33 includes a guide slider fitting with the guide rail, the linear motor is disposed on the bracket 10, the guide rail is disposed on the bracket 10, the guide slider is slidably coupled to the guide rail, and the guide slider is coupled to an output end of the linear motor. In this way, the linear motor is controlled to start, the linear motor drives the slider to slide relative to the guide rail, the guide slider drives the two rotating shafts 22 to rotate synchronously through the two coupling rods 32 and the two cranks 31, and the two rotating shafts 22 drive the two decks 21 to rotate synchronously to the folded positions or unfolded positions, which improves the degree of automation of the foot-deck device 100, reduces the labor intensity of the user, makes the operation simpler, and only needs to control the linear motor to start.

Embodiment 4

The present disclosure further provides unillustrated Embodiment 4. Embodiment 4 is different from Embodiment 2 in that the linkage mechanism 30 includes a first linkage assembly 130 used to be coupled to one deck assembly 20 and a second linkage assembly 140 used to be coupled to the other deck assembly 20, the first linkage assembly 130 and the second linkage assembly 140 each including a first sprocket, a second sprocket, a synchronous chain, and a first gear 37. The first sprockets are disposed on the respective rotating shafts 22, the second sprockets are spaced apart from the respective first sprockets, the synchronous chains are fitted over the respective first and second sprockets, and the first gears 37 are coupled to the respective second sprockets; and the first gear 37 of the first linkage assembly 130 engages with the first gear 37 of the second linkage assembly 140. In Embodiment 4, the sprockets are used to replace the pulleys. Other transmission manners are the same, and are not described in detail here.

Embodiment 5

The present disclosure further provides unillustrated Embodiment 5. Embodiment 5 is different from Embodiment 2 in that the linkage mechanism 30 includes a first linkage assembly 130 used to be coupled to one deck assembly 20 and a second linkage assembly 140 used to be coupled to the other deck assembly 20, the first linkage assembly 130 and the second linkage assembly 140 each include a first gear 37, and the first gears 37 are disposed on the respective rotating shafts 22; and the first gear 37 of the first linkage assembly 130 engages with the first gear 37 of the second linkage assembly 140. In this way, the structure of the linkage mechanism 30 is further simplified. When the first gear 37 of the first linkage assembly 130 rotates under an external force, it drives the first gear 37 of the second linkage assembly 140 to rotate, and at the same time, the first gears 37 drive the respective rotating shafts 22 to rotate, so that the decks 21 of the two deck assemblies 20 rotate synchronously to the folded positions or unfolded positions.

Embodiment 6

The present disclosure further provides unillustrated Embodiment 6. Embodiment 6 is different from Embodiment 5 in that the first linkage assembly 130 and the second linkage assembly 140 each include a plurality of transmission gears engaging with each other in a preset transmission direction, transmission gears in the plurality of transmission gears located at transmission head ends are the first gears 37, the first gears 37 are fitted over the respective rotating shafts 22, and one transmission gear of the first linkage assembly 130 located at a transmission tail end engages with one transmission gear of the second linkage assembly 140 located at a transmission tail end. In this way, when the two rotating shafts 22 are at a larger interval, in order to avoid a large size of the first gears 37, a plurality of second gears engaging with each other are added between the two first gears 37, so that the decks 21 of the two deck assemblies 20 rotate synchronously to the folded positions or unfolded positions through the plurality of transmission gears.

The transmission gears include a plurality of second gears engaging with each other and two first gears 37. An even number of second gears are provided, so as to ensure that the two rotating shafts 22 rotate in opposite directions.

Embodiment 7

The present disclosure further provides unillustrated Embodiment 7. Embodiment 7 is different from Embodiment 1 in that the linkage mechanism 30 includes a first stay wire and a second stay wire, and first ends of the first stay wire and the second stay wire are coupled to the rotating shafts 22 of the two deck assemblies 20 respectively, so that the rotating shafts 22 of the two deck assemblies 20 are driven to rotate synchronously through second ends of the first stay wire and the second stay wire. In this way, the second ends of the first stay wire and the second stay wire drive the rotating shafts 22 of the two deck assemblies 20 under an external force, so that the decks 21 of the two deck assemblies 20 rotate synchronously to the folded positions or unfolded positions through the first stay wire and the second stay wire.

It needs to be noted that the linkage mechanism is used to establish a linkage relationship between the left deck and the right deck. The linkage mechanism 30 is not limited to the specific embodiments provided in the present disclosure, provided that the decks 21 of the two deck assemblies 20 can rotate synchronously to the folded positions or unfolded positions.

In some embodiments, the foot-deck device 100 provided in the present disclosure is used to place a user's feet while the user is driving a vehicle 1000.

In some embodiments, the foot-deck device 100 provided in the present disclosure is used for a user to stand on a vehicle 1000 through the foot-deck device 100 while the user is driving the vehicle 1000.

In some embodiments, the bracket 10 may be a separate component or a frame of the vehicle 1000.

Figure 9:
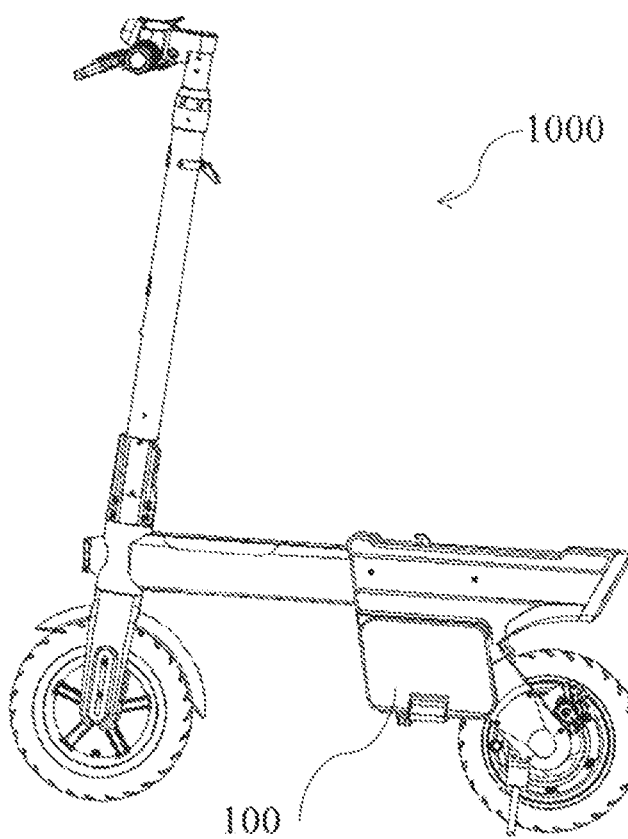
FIG. 9 is a schematic view of a vehicle according to an embodiment of the present disclosure.

As illustrated in FIG. 9, the present disclosure further provides a vehicle 1000. The vehicle 1000 includes a foot-deck device 100. The foot-deck device 100 is the foot-deck device 100 described above. The foot-deck device 100 of the vehicle 1000 provided in the present disclosure can be switched between an unfolded position and a folded position, so as to facilitate storage and transportation of the vehicle 1000. At the same time, the two decks 21 of the foot-deck device 100 can be folded or unfolded with linkage to simplify the operation.

In some embodiments, when a motor is added to the foot-deck device 100 provided in the present disclosure, open and close actions of the decks on both sides can be controlled by the motor, which can realize automatic folding of the decks on both sides with linkage, further simplifying the operation and making the product more intelligent and automatic.

In some embodiments, the vehicle 1000 is a bicycle or an electric bicycle.

In some embodiments, the vehicle 1000 is an electric scooter, an electric unicycle, or an electric motorcycle.

It needs to be noted that the terms used here are intended only to describe specific implementations, but are not intended to limit exemplary implementations of the present disclosure. As used herein, the singular forms are intended to include the plural forms as well, unless the context clearly indicates otherwise. In addition, it should be further understood that the terms "include" and/or "comprise," when used in the specification, specify the presence of features, steps, operations, devices, components, and/or their combinations.

Unless otherwise specified, relative arrangements of components and steps, numerical expressions, and values described in these embodiments do not limit the scope of the present disclosure. Meanwhile, it should be understood that, in order to facilitate the description, sizes of respective parts illustrated in the drawings are not drawn according to an actual proportional relationship. Technologies, methods, and devices known by those of ordinary skill in the art may not be discussed in detail, but in appropriate situations, the technologies, methods, and devices should be regarded as part of the specification. In all the examples illustrated and discussed herein, any specific value should be construed as merely illustrative and not as a limitation. Thus, other examples of exemplary embodiments may have different values. It is to be noted that, similar reference numerals and letters denote similar items in the following drawings, and therefore, once an item is defined in one drawing, there is no need for further discussion in the subsequent drawings.

In the description of the present disclosure, it will be appreciated that locative or positional relations indicated by "front, back, up, down, left, and right", "lateral, vertical, perpendicular, and horizontal", "top and bottom" and other terms are locative or positional relations shown on the basis of the drawings, which are intended only to make it convenient to describe the present disclosure and to simplify the description. In the absence of contrary description, the orientation terms do not indicate or imply that the referred device or element must have a specific location and must be constructed and operated with the specific location, and accordingly it cannot be understood as limitations to the present disclosure. The orientation terms "inner and outer" refer to inner and outer contours of each component.

For ease of description, spatial relative terms such as "over", "above", "on an upper surface" and "upper" may be used herein for describing a spatial position relation between a device or feature and other devices or features shown in the drawings. It will be appreciated that the spatial relative terms are intended to contain different orientations in usage or operation other than the orientations of the devices described in the drawings. For example, if a device in the drawings is inverted, devices described as "above other devices or structures" or "over other devices or structures" will be located as "below other devices or structures" or "under other devices or structures". Thus, an exemplary term "above" may include two orientations, namely "above" and "below". The device may be located in other different manners (rotated by 90 degrees or located in other orientations), and spatial relative descriptions used herein are correspondingly explained.

It needs to be noted that, terms such as "first" and "second" in the specification, claims, and the drawings of the present disclosure are only used to distinguish similar objects, and are not used to describe specific sequence or order. It is to be understood that data used in this manner may be interchangeable where appropriate, so that the implementations of the present disclosure described herein may be realized in sequences excluding those illustrated or described herein.

The above are merely preferred embodiments of the present disclosure, and are not used to limit the present disclosure. For those skilled in the art, the present disclosure may have various alterations and changes. Any alteration, equivalent replacement, improvement, and the like made within the spirit and principle of the present disclosure all fall within the protection scope of the present disclosure.

What is claimed is:

1. A foot-deck device, comprising:
    a bracket;
    two deck assemblies oppositely disposed on the bracket, the two deck assemblies each comprising a deck and a rotating shaft, the rotating shafts being pivotally disposed on the bracket, and the decks being disposed on the respective rotating shafts; and
    a linkage mechanism, the rotating shaft of one deck assembly being coupled to the rotating shaft of the other deck assembly through the linkage mechanism, the linkage mechanism being configured to cause the rotating shafts of the two deck assemblies to rotate synchronously and cause the decks of the two deck assemblies to rotate synchronously to respective folded positions or unfolded position,
    wherein the rotating shaft of one deck assembly and the rotating shaft of the other deck assembly have opposite rotation directions, so that the decks of the two deck assemblies rotate towards each other to the folded positions or rotate away from each other to the unfolded positions.

2. The foot-deck device according to claim 1, wherein the foot-deck device further comprises an electric drive mechanism, an output end of the electric drive mechanism being coupled to the linkage mechanism, so that the decks of the two deck assemblies are driven to rotate synchronously through the electric drive mechanism.

3. The foot-deck device according to claim 1, further comprising a manual trigger mechanism, the manual trigger mechanism being coupled to any one of the rotating shafts of the two deck assemblies, and the manual trigger mechanism having a manual trigger end, so that the two decks are driven to rotate synchronously through the manual trigger end under an external force.

4. The foot-deck device according to claim 1, wherein
    one of the decks of the two deck assemblies serves as a manual trigger end, so that the decks of the two deck assemblies are driven to rotate synchronously through the manual trigger end under an external force.

5. The foot-deck device according to claim 1, wherein the linkage mechanism comprises:
    a first linkage assembly coupled to one deck assembly and a second linkage assembly coupled to the other deck assembly, the first linkage assembly and the second linkage assembly each comprising a crank and a coupling rod, first ends of the cranks being coupled to the respective decks, and first ends of the coupling rods being hinged to second ends of the respective cranks; and
a coupling member hinged to both a second end of the coupling rod of the first linkage assembly and a second end of the coupling rod of the second linkage assembly, and the coupling member being movably disposed in a vertical direction, so that the rotating shafts of the two deck assemblies are driven to rotate synchronously through the coupling member.

6. The foot-deck device according to claim 5, wherein
the foot-deck device comprises a rotary motor and a lead screw, the coupling member comprises a nut fitting with the lead screw, the rotary motor is disposed on the bracket, the lead screw is coupled to an output shaft of the rotary motor, and the nut is fitted over the lead screw; and the coupling member is hinged to the second end of the coupling rod of the first linkage assembly and the second end of the coupling rod of the second linkage assembly through the nut.

7. The foot-deck device according to claim 6, wherein the nut is provided with a coupling slider, and the coupling member is hinged to the second end of the coupling rod of the first linkage assembly and the second end of the coupling rod of the second linkage assembly through the coupling slider.

8. The foot-deck device according to claim 6, wherein when the nut moves downwards, left and right decks are closed until the two decks move to the folded positions; when the nut moves upwards, the left and right decks are unfolded until the two decks move to the unfolded positions.

9. The foot-deck device according to claim 6, wherein the bracket comprises a column, a support base, and a fixed plate, the support base is mounted on the column for fixing the lead screw, and the fixed plate is mounted on the column for fixing the rotary motor.

10. The foot-deck device according to claim 6, further comprising a mounting member, the mounting member is coupled to the nut, the coupling rod is coupled to the mounting member, and second ends of the two coupling rods are coupled to the nut through the mounting member.

11. The foot-deck device according to claim 1, wherein
the linkage mechanism comprises a first linkage assembly coupled to one deck assembly and a second linkage assembly coupled to the other deck assembly, the first linkage assembly and the second linkage assembly each comprising a first pulley, a second pulley, a synchronous belt, and a first gear,
wherein the first pulleys are disposed on the respective rotating shafts, the second pulleys are spaced apart from the respective first pulleys, the synchronous belts are fitted over the respective first and second pulleys, and the first gears are coupled to the respective second pulleys; and the first gear of the first linkage assembly engages with the first gear of the second linkage assembly.

12. The foot-deck device according to claim 11, wherein the first linkage assembly and the second linkage assembly each comprise a reversing pulley and a tension pulley, the reversing pulleys are disposed between the respective first and second pulleys, the first pulleys and the reversing pulleys are spaced apart in a first direction, the second pulleys and the reversing pulleys are spaced apart in a second direction, the synchronous belts are fitted over the first pulleys, the reversing pulleys, and the second pulleys, and the tension pulleys are spaced apart from the reversing pulleys and are located on outer sides of the synchronous belts, so that the synchronous belts each comprise a first transmission portion extending in the first direction and a second transmission portion extending in the second direction.

13. The foot-deck device according to claim 11, wherein the foot-deck device comprises a rotary motor, an output end of the rotary motor being coupled to the first gear of the first linkage assembly or the first gear of the second linkage assembly.

14. The foot-deck device according to claim 1, wherein the linkage mechanism comprises a driving component and a driven component,
wherein one driving component and two driven components are provided, one driven component is coupled to one deck assembly, the other driven component is coupled to the other deck assembly, and the driving component is drivingly coupled to the two driven components.

15. The foot-deck device according to claim 1, wherein the linkage mechanism comprises:
a lifting assembly having a lifting portion movable in a predetermined direction; and two coupling rods both coupled to the lifting portion, one coupling rod being drivingly coupled to one deck assembly, and the other coupling rod being drivingly coupled to the other deck assembly.

16. The foot-deck device according to claim 1, wherein the linkage mechanism comprises:
two driving wheels drivingly coupled to move synchronously; one driving wheel and the rotating shaft of one deck assembly being fitted with a first synchronous belt, and the other driving wheel and the rotating shaft of the other deck assembly being fitted with a second synchronous belt; and
two driven wheel sets pressed on the first synchronous belt and the second synchronous belt in a one-to-one correspondence.

17. The foot-deck device according to claim 1, wherein the bracket is a single part or an assembly formed by fixed couplings and combinations of a plurality of parts.

18. The foot-deck device according to claim 1, wherein the bracket is configured as a frame of a vehicle.

19. A vehicle, comprising:
a frame; and
a foot-deck device comprising:
 a bracket;
 two deck assemblies oppositely disposed on the bracket, the two deck assemblies each comprising a deck and a rotating shaft, the rotating shafts being pivotally disposed on the bracket, and the decks being disposed on the respective rotating shafts; and
 a linkage mechanism, the rotating shaft of one deck assembly being coupled to the rotating shaft of the other deck assembly through the linkage mechanism, the linkage mechanism being configured to cause the rotating shafts of the two deck assemblies to rotate synchronously and cause the decks of the two deck assemblies to rotate synchronously to respective folded positions or unfolded positions,
wherein the foot-deck device is secured to the frame; and
wherein the rotating shaft of one deck assembly and the rotating shaft of the other deck assembly have opposite rotation directions, so that the decks of the two deck assemblies rotate towards each other to the folded positions or rotate away from each other to the unfolded positions.

20. A foot-deck device, comprising:

a bracket;

two deck assemblies oppositely disposed on the bracket, the two deck assemblies each comprising a deck and a rotating shaft, the rotating shafts being pivotally disposed on the bracket, and the decks being disposed on the respective rotating shafts; and a linkage mechanism, the rotating shaft of one deck assembly being coupled to the rotating shaft of the other deck assembly through the linkage mechanism, the linkage mechanism being configured to cause the rotating shafts of the two deck assemblies to rotate synchronously and cause the decks of the two deck assemblies to rotate synchronously to respective folded positions or unfolded positions, wherein the linkage mechanism comprises a driving component and a driven component, wherein one driving component and two driven components are provided, one driven component is coupled to one deck assembly, the other driven component is coupled to the other deck assembly, and the driving component is drivingly coupled to the two driven components.

* * * * *